(No Model.)  3 Sheets—Sheet 1.

M. BOELTE.
MAGAZINE CAMERA.

No. 541,832. Patented July 2, 1895.

Witnesses:  Inventor
Max Boelte.
By John Wedderburn
Attorney (No Model.) 3 Sheets—Sheet 2.

M. BOELTE.
MAGAZINE CAMERA.

No. 541,832. Patented July 2, 1895.

Witnesses
J. W. Reynolds
Chas. B. Hyer

Inventor
Max Boelte
By John Wedderburn
Attorney (No Model.) 3 Sheets—Sheet 3.

M. BOELTE.
MAGAZINE CAMERA.

No. 541,832. Patented July 2, 1895.

Witnesses
J. W. Reynolds
Chas. B. Hyer

Inventor
Max Boelte
By John Wedderburn
Attorney

UNITED STATES PATENT OFFICE.

MAX BOELTE, OF LOS ANGELES, CALIFORNIA.

MAGAZINE-CAMERA.

SPECIFICATION forming part of Letters Patent No. 541,832, dated July 2, 1895.

Application filed June 22, 1894. Serial No. 515,328. (No model.)

*To all whom it may concern:*

Be it known that I, MAX BOELTE, a citizen of the United States, residing at Los Angeles, in the county of Los Angeles and State of California, have invented certain new and useful Improvements in Magazine-Cameras; and I do hereby declare the following to be a full, clear, and exact description of the invention, such as will enable others skilled in the art to which it appertains to make and use the same.

This invention relates to certain new and useful improvements in photographic cameras, of that class in which provision is made for the disposition of the plates or films as they are exposed so that the trouble of loading and unloading is avoided, and it has for its objects among others to provide an improved camera in which the plates or films may be handled with ease and rapidity, and in which the mechanism shall be simplified and rendered more efficient and less liable to get out of order.

I aim further at improvements in the details of construction of the various parts and of the device as a whole.

Other objects and advantages of the invention will hereinafter appear and the novel features thereof will be specifically defined by the appended claims.

The invention, in what I at the present time, consider its preferable form, is clearly illustrated in the accompanying drawings, which, with the letters of reference marked thereon, form a part of this specification, and in which—

Figure 1:
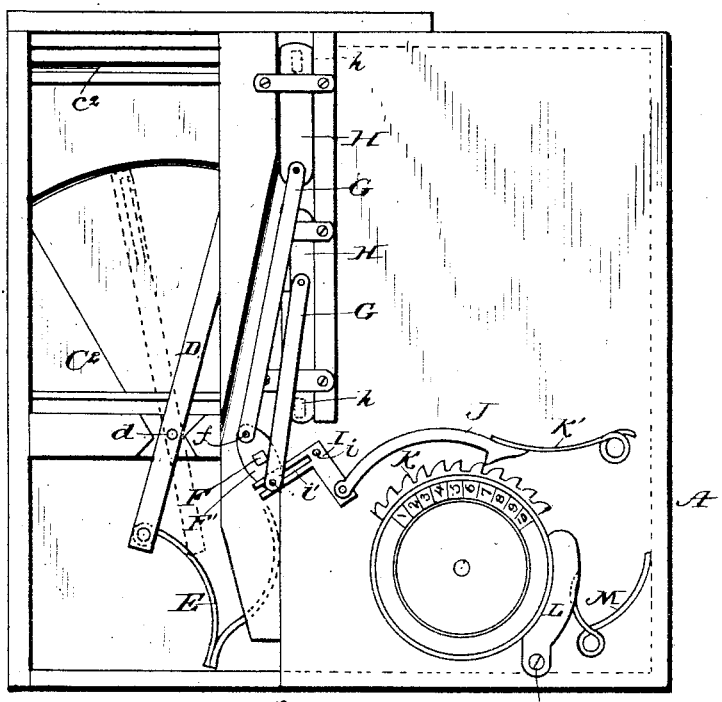
Figure 2:
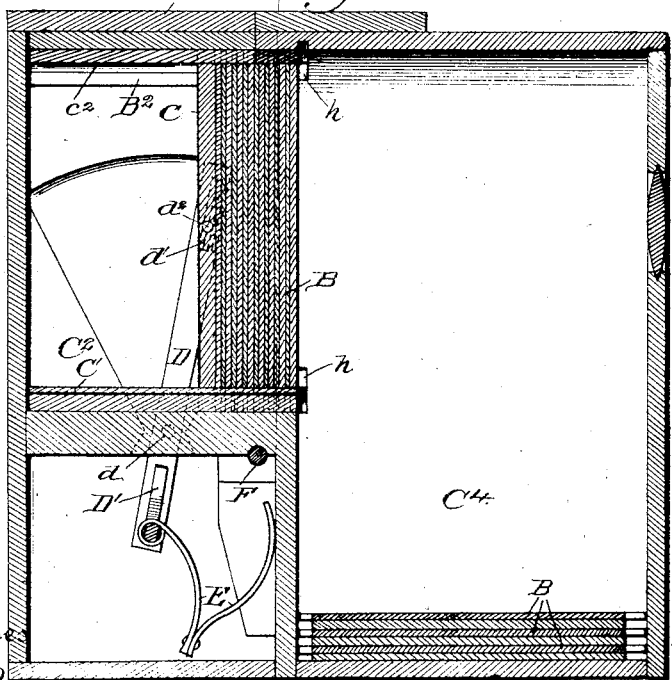
Figure 3:
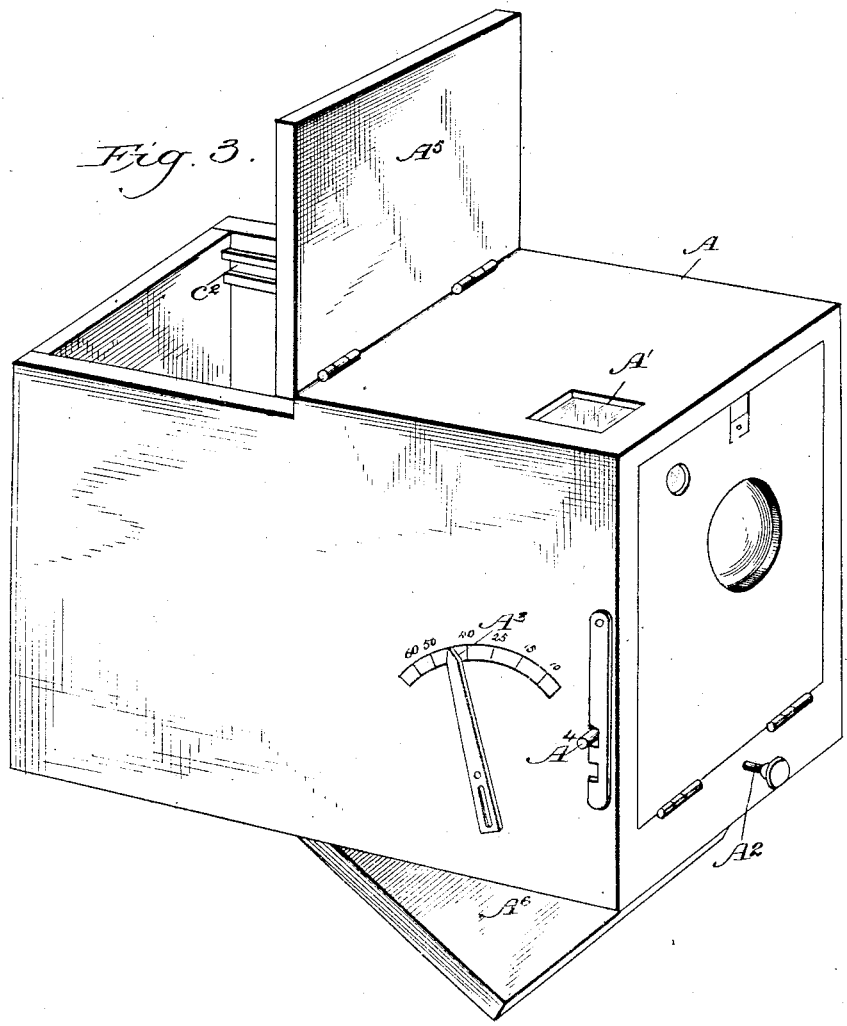
Figure 8:
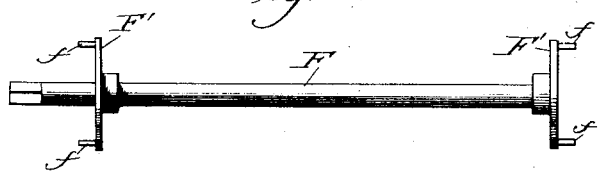
Figure 6:
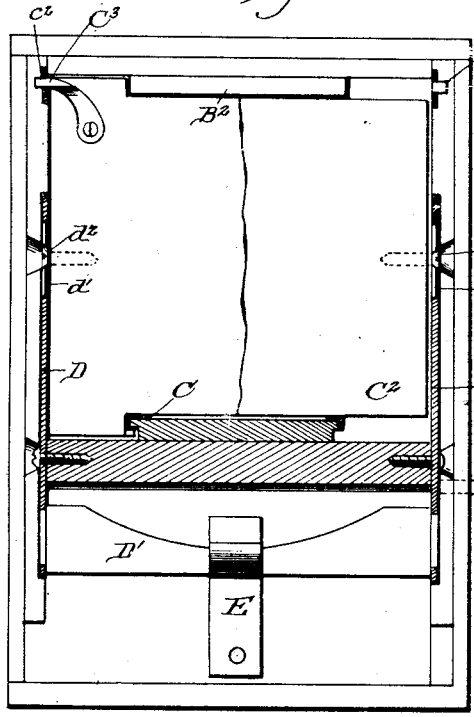
Figure 7:
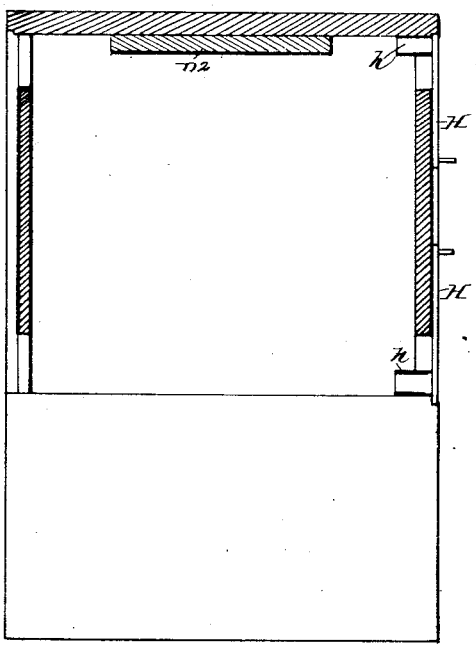
Figure 5:
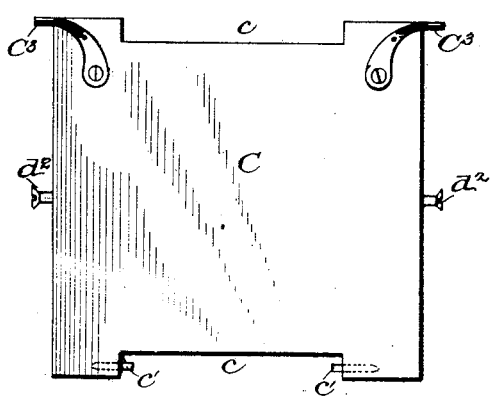
Figure 4:
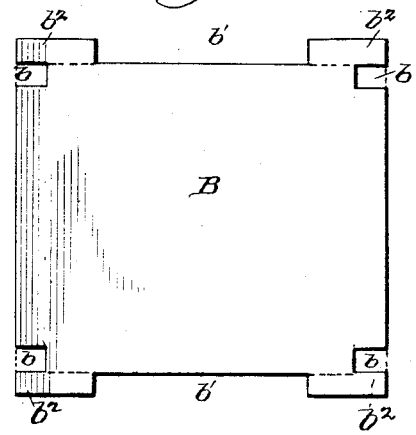

Figure 1 is a side elevation, with portions broken away, of a camera embodying my invention. Fig. 2 is a vertical, central, longitudinal section of the same. Fig. 3 is a perspective view of the camera with the upper and lower lids open. Fig. 4 is a view of one of the septums. Fig. 5 is a like view of the pressure board. Fig. 6 is a section on the line $x$—$x$ of Fig. 2, the casing being shown in elevation and the pressure board and plates or films being broken away. Fig. 7 is an end view with portions in section, and as shown at the left the slides and their stops are removed, while at the right they are shown in the position they assume when holding the septum against movement. Fig. 8 is a detail of the operating shaft removed with its cams.

Like letters of reference indicate like parts throughout the several views.

Referring now to the details of the drawings A represents the case of suitable material, shape, and capacity, being provided with the finder $A'$, focusing rod $A^2$, and index $A^3$, shutter release $A^4$, and shutter and lens of any well known or approved type. This part of the device forms no part of the present invention and hence a detailed description thereof is not necessary, nor is it necessary to illustrate the same, such being understood by any one skilled in the art.

The camera is provided at the top at the end opposite the lens with a cover or lid $A^5$ through the opening beneath which the plates or films and septums may be introduced, and at the opposite end, upon the under side is a lid or door $A^6$ closing the opening through which the same may be withdrawn when desired. I may use dry plates or films. Between every two plates or films I insert a septum B which as seen best in Fig. 4, is provided upon its opposite ends near the corners with the notches $b$, and upon its top and bottom edges with larger notches $b'$ the said notches forming at the four corners thereof the wings $b^2$. The plates or films and septums are inserted through the opening at the top of the case and are designed to be held between a pressure board and stops on slides soon to be described. In inserting them the pressure board is moved to the left, see Fig. 2, and the plates or films and septums placed in front of the same, and when the pressure board is released its spring forces it to the right with the plates or films and septums with it till the first one comes in contact with the stops before mentioned. These plates are of a size and shape to fit against the septums as shown in dotted lines in Fig. 4.

The pressure board C is of substantially the same shape and size as the septum and is provided at the top and bottom edge with the notches $c$ as seen best in Fig. 5. At opposite sides of the bottom notch are the pins or projections $c'$ which engage beneath the rabbeted edges of the guide plates $C'$ which is secured to the bottom of the chamber $C^2$ in which the plates or films and septums are held until they are exposed. The upper edge of the pressure board is provided at the corners with the horns $C^3$ which are adapted to ride in the guide grooves $c^2$ in the side walls of the case at the upper portion thereof, as seen in Figs. 2 and 6. The upper lid of the camera carries upon its under face a guide plate $B^2$ which receives the upper notches of the pressure board and septums, as seen in Figs. 6 and 7. As seen in Fig. 2 and also in Fig. 1 the chamber $C^2$ is of less depth than the storage chamber $C^4$ into which the plates and septums are dropped after they have been exposed. In Fig. 2 some of the septums and plates are shown as having been exposed and dropped into the storage chamber, from which they are removed in the dark room.

The pressure board is designed to be held against the septums and plates or films so as to keep the same pushed forward, in the following manner: D are bars arranged to move in grooves in the inner walls of the case and mounted between their end upon pivots $d$, their lower ends being connected by the cross-bar D' as seen best in Fig. 6 and their upper ends having a connection with the edges of the pressure board as seen best in Fig. 2 where the bars are shown as provided with the elongated slots $d'$ in which work the pins or screws $d^2$ on the edges of the pressure board, this being necessary to allow of the requisite movements of the bars in the operation of the pressure board. The upper end of the said bars are urged forward against the pressure board to press the same against the plates or films and septums by a double spring E which has one end branch, or arm engaged or connected with the cross-bar of the pressure-board frame and its other arm, end, or branch bearing against some fixed part, as the offset of the case beneath the chamber $C^2$ as shown in Figs. 1 and 2.

F is a shaft extending from side to side of the case, being supported in the side walls thereof and at each end carrying a crank arm F' as seen best in Fig. 8, and near each end of each crank arm is a pin $f$. To each of these pins is connected pivotally a bar or push-rod G, it being understood that there are thus two of these rods at each side of the camera. Each of these rods is pivotally connected with a slide H, said slides being mounted to slide in suitable guides or grooves as shown in Figs. 1 and 7, and each having a lateral pin or stop $h$ as seen best in Figs. 1, 2 and 7 which work through openings provided therefor, and against which stops or pins the innermost of the plates or films is designed to be forced by the pressure board and by which stops the plate or film is prevented from falling from the chamber $C^2$ down into the storage chamber until the slides have been moved so that the said stops or pins come coincident with the notches in the side edges of the septums.

I is a bell-crank or angle lever pivoted at its elbow as at $i$ upon the side wall of the storage chamber as seen in Fig. 1 and one arm of this lever has a longitudinal slot $i'$ open at its lower end and in this slot works the pin on the crank arm, the pin being upon that side of the pivot or shaft of the crank arm which is connected with the rod connected with the lower slide as seen clearly in Fig. 1. To the other end or arm of this lever is pivoted a pawl J which is mounted to engage the teeth of the ratchet K, and upon this pawl bears a spring arm K'. A brake L is pivoted at $l$ to bear against the periphery of the hub portion of the ratchet and is itself acted upon by a spring M. The face of the ratchet is graduated as shown to indicate the number of plates or films exposed.

One end of the shaft F is extended and is designed to receive a detachable arm or handle N shown in position in Fig. 3 and by which the said shaft may be turned when necessary.

With the parts constructed and arranged substantially as above set forth, the operation is as follows: The chamber $C^2$ being loaded and the lid closed, the pressure board is pressing the plates or films and septums toward each other and against the stops $h, h$, on the slides.

When a plate is being exposed, the pins $h, h$, are in their inner position and are bearing directly against a film or plate, the same registering with the notches $b, b$, of the septum following. Now after the exposure, the lever N is moved to turn the shaft F, which through the medium of the push-rods moves the slides away from one another until the said stops or pins come opposite to and bear against the wings $b^2, b^2$, of the following septum. The plate which has just been exposed is thereby released and falls down into the storage chamber. The front plate at this point is covered by a septum. To release this septum the pins $h, h$, are, by means of the mechanism described, drawn together until they register with the notches $b, b$. This septum is now free and drops into the storage chamber and the following plate is gripped and ready for exposure. As the shaft F is turned the pawl J turns the ratchet one tooth and thereby the number of exposures is registered.

Modifications in detail may be resorted to without departing from the spirit of the invention or sacrificing any of its advantages.

What is claimed as new is—

1. In a camera, the combination with a pressure board, of stops for the plates, consisting of inwardly projecting pins secured to a pair of slides, and means for moving said slides simultaneously in opposite directions, substantially as described.

2. In a camera, the combination with a pressure board, of stops for the plates, consisting of inwardly projecting pins secured to a pair of slides, septums having notches in their edges forming wings at the four corners thereof, which wings project beyond the sides of the plates and are adapted to be engaged by said stops, and means for moving said slides simultaneously in opposite directions, whereby the said plates and said septums may be alternately engaged and disengaged from said slides, substantially as described.

3. The combination with a pressure board mounted to slide, having notches in its upper and lower edges, pins projecting inwardly from the lower notch and horns mounted to said pressure board at its upper corners, which pins and horns move in corresponding guides in the casing in which they are mounted, of a pressure frame acting against said board, and a spring acting upon said frame.

4. A septum having notches in its sides forming wings at the four corners thereof, which are adapted to project beyond the sides of the plates between which said septums are inserted, one of said notches adapted to co-operate with a guide, and the said septums being adapted to co-operate with a pair of oppositely movable slides having stops thereon, substantially as described.

5. A pressure-board having horns at its upper corners, and a notch upon its lower edge with projections to engage in guides, as set forth.

6. The combination with a septum having notches in its sides forming wings at the four corners thereof, which are adapted to project beyond the sides of the plates between which said septums are inserted, one of said notches adapted to co-operate with a guide, of vertically movable slides having lateral stops thereon, and a spring-pressed pressure board, substantially as specified.

7. The combination with a septum having notches in its sides forming wings at the four corners thereof, which are adapted to project beyond the sides of the plates between which said septums are inserted, one of said notches adapted to co-operate with a guide, of vertically movable slides having lateral stops therein, and a spring-pressed pressure board, and means for simultaneously moving said slides in opposite directions to bring said stops in co-incident position with the notches of the septum, substantially as described.

8. The combination with a pressure board having projections thereon, which are adapted to fit corresponding guides in the casing in which the same is mounted, of slides in the forward part of the magazine, having inwardly projecting stops thereon, a shaft mounted for rotation and having crank arms at its opposite ends, rods connecting respectively the said slides and the said crank arm, whereby upon the rotation of said shaft the said slides are drawn toward or away from one another for the purpose described, a pressure frame connected to said pressure board, and a spring connected to said pressure frame for urging the same forward, substantially as specified.

9. The combination with a pressure board having projections thereon, which are adapted to fit corresponding guides in the casing in which the same is mounted, of slides in the forward part of the magazine, having inwardly projecting stops thereon, a shaft mounted for rotation and having crank arms at its opposite ends, rods connecting respectively the said slides and the said crank arms, whereby upon the rotation of said shaft the said slides are drawn toward or away from one another for the purpose described, a presser frame having its side bars connected with the edges of the said pressure board by a sliding connection, and a spring acting upon the cross bar of the said frame, substantially as specified.

10. The combination with the slides having lateral stops thereon, means for actuating them simultaneously in opposite directions, of a septum having notches in its edges forming projecting wings at the corners thereof, one of said notches co-operating with a guide therefor, a spring pressed pressure board having notches in its upper and lower edges, inwardly projecting pins in the lower notch, and projecting horns at the upper corner thereof, which pins and horns co-operate with corresponding guides, substantially as and for the purpose described.

11. The combination with the slides with their stops, of the shaft with crank-arms, rods pivotally connecting said crank arms with the slides, and a lever detachably mounted on an extended end of said lever, as set forth.

12. In a camera, the combination of a pair of slides having inwardly projecting stops thereon, a shaft having crank arms on its ends, rods connecting the slides respectively and the opposite ends of said crank arms, a ratchet and indicator, a pawl engaging said ratchet, and an angle lever having one arm connected to said pawl and having a slot in its other arm, which is engaged by one of the crank arms on said shaft, substantially as and for the purpose described.

13. The combination with the slides and their stops, of the shaft with crank-arms connected with the slides, the ratchet and its pawl, and the angle lever pivoted at its angle and connected at one end with the said pawl and its other arm slotted to receive a pin on the end of one of the said crank-arms, substantially as specified.

14. The combination with the ratchet having a hub with indicator on its face, of the pawl engaging the teeth of the ratchet, a spring bearing on said pawl, a brake bearing against the periphery of the hub, and a spring acting upon the said brake, substantially as specified.

In testimony whereof I have signed this specification in the presence of two subscribing witnesses.

MAX BOELTE.

Witnesses:
GEO. A. MONTGOMERY,
H. B. EAKINS.